United States Patent
Clemente

(10) Patent No.: US 11,483,017 B2
(45) Date of Patent: Oct. 25, 2022

(54) UNIT CELL OF A TRANSMITTER ARRAY

(71) Applicant: Commissariat a l'Energie Atomique et aux Energies Alternatives, Paris (FR)

(72) Inventor: Antonio Clemente, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 29 days.

(21) Appl. No.: 17/124,754

(22) Filed: Dec. 17, 2020

(65) Prior Publication Data

US 2021/0194512 A1 Jun. 24, 2021

(30) Foreign Application Priority Data

Dec. 18, 2019 (FR) ...................................... 19 14716

(51) Int. Cl.
*H01Q 1/52* (2006.01)
*H04B 1/00* (2006.01)
(Continued)

(52) U.S. Cl.
CPC ............. *H04B 1/0064* (2013.01); *H01Q 1/48* (2013.01); *H01Q 1/523* (2013.01); *H01Q 3/34* (2013.01)

(58) Field of Classification Search
CPC .. H01Q 1/22–48; H01Q 1/52; H01Q 3/30–36; H01Q 21/06; H01Q 21/22; H04B 1/006
See application file for complete search history.

(56) References Cited

U.S. PATENT DOCUMENTS 8,842,045 B2 * 9/2014 Tatarnikov ............. H01Q 21/30
343/846
2007/0001918 A1 1/2007 Ebling et al.
(Continued)

FOREIGN PATENT DOCUMENTS

EP 2 070 158 A2 6/2009
WO WO 2008/066591 A2 6/2008

OTHER PUBLICATIONS

French Preliminary Search Report dated Aug. 26, 2020 in French Application 19 14716 filed on Dec. 18, 2019 (with English Translation of Categories of Cited Documents & Written Opinion), 12 pages.
(Continued)

*Primary Examiner* — Hasan Islam
(74) *Attorney, Agent, or Firm* — Oblon, McClelland, Maier & Neustadt, L.L.P.

(57) ABSTRACT

A unit cell of a transmitter array includes a ground plane; first and second dielectric substrates, arranged on either side of the ground plane, and each having a first surface, oriented toward the ground plane, and a second, opposed, surface; first and second planar antennas, extending on the second surfaces of the first and second dielectric substrates, respectively; and a via, arranged to pass through the first and second dielectric substrates so as to electrically connect the first and second planar antennas; the via being electrically isolated from the ground plane. The unit cell further includes a third planar antenna, extending between the ground plane and the first surface of the first dielectric substrate, and electrically connected to the via.

12 Claims, 4 Drawing Sheets

(51) Int. Cl.
*H01Q 1/48* (2006.01)
*H01Q 3/34* (2006.01)

(56) References Cited

U.S. PATENT DOCUMENTS

| | | |
|---|---|---|
| 2008/0030416 A1 | 2/2008 | Lee et al. |
| 2013/0271346 A1 | 10/2013 | Dussopt et al. |
| 2018/0301807 A1* | 10/2018 | Clemente ................. H01Q 3/34 |
| 2019/0288403 A1* | 9/2019 | Clemente ............... H01Q 21/22 |

OTHER PUBLICATIONS

Clemente et al., "Design of a Reconfigurable Transmit-Array at X-Band Frequencies", IEEE 15$^{th}$ International Symposium on Antenna Technology and Applied Electromagnetics (ANTEM), Jun. 25, 2012, 4 pages.

* cited by examiner

UNIT CELL OF A TRANSMITTER ARRAY

TECHNICAL FIELD

The invention relates to the technical field of transmitter array antennas ("Transmit array antennas"). A transmitter array antenna comprises:

- a transmitter array (also called an electromagnetic lens) comprising a set of unit cells that can be arranged in matrix form (the matrix may be a regular matrix or a scatter matrix; the regular matrix may, for example, have a square or triangular mesh); and
- at least one radiating source (called a primary source), arranged to illuminate the transmitter array.

Each unit cell of the transmitter array is capable of introducing a phase shift to an incident wave emitted by the primary source or sources, in order to compensate each difference in the path of the radiation emitted between the primary source or sources and the transmitter array. More precisely, each unit cell of the transmitter array may comprise:

- a first antenna (called the reception antenna), arranged to receive the incident wave emitted by the primary source or sources; and
- a second antenna (called the transmission antenna), arranged to transmit, with a phase shift, the incident wave received by the first antenna.

Other architectures of unit cells may be used, such as multilayer structures based on the concept of frequency-selective surfaces, or on the concept of Fabry-Perot cavities. Radiating elements of the dipole, slot and other types may also be used in the unit cell.

It should be noted that a unit cell of a transmitter array may operate in reception or in transmission; that is to say, the first antenna of the unit cell may also be a transmission antenna, while the second antenna of the unit cell may also be a reception antenna.

The invention may be applied, notably, for obtaining a reconfigurable antenna. "Reconfigurable" is taken to mean that at least one characteristic of the antenna may be modified during its service life, after its manufacture. The generally modifiable characteristics are the frequency response (in amplitude and phase), the radiating pattern (also called the beam), and the polarization. The reconfiguration of the frequency response covers different functionalities such as frequency switching, frequency tuning, passband variation, phase shifting, frequency filtering, etc. The reconfiguration of the radiating pattern covers different functionalities such as angular scanning of the beam pointing direction (also called disalignment), the beamwidth typically defined at mid-power (that is to say, the concentration of the radiation in a particular direction), the spatial filtering (related to the beamwidth and the beam formation), the formation of a beam or multibeams (e.g. a number of narrow beams replacing a wide beam), etc. A reconfigurable antenna with a transmitter array is particularly advantageous from the C-band (4-8 GHz) to the W-band (75-110 GHz), or even the D-band (110-170 GHz) or up to the 300 GHz band, for the following applications:

- motor vehicle radars for driver assistance and aid, for active safety purposes,
- very high resolution imagery and surveillance systems,
- very high-speed communication systems, operating notably in the millimeter bands (inter-building or intra-building communications in a home automation or building automation environment, particularly suitable for monitoring users),
- ground to satellite remote measurement links in low orbit ("Low Earth Orbit") in the Ka-band, satellite telecommunications with a reconfigurable primary source (SOTM™, for "Satcom-on-the-Move", the internet, television, etc.), and
- point-to-point and point-to-multipoint (light rail networks, "Fronthaul" and "Backhaul" systems for cellular arrays, radio access for fifth-generation mobile networks, etc.).

The invention is also applicable to the multiplexing of two signals from two primary sources illuminating the transmitter array, or to the demultiplexing of a composite signal from a primary source illuminating the transmitter array.

PRIOR ART

A unit cell of a transmitter array for a reconfigurable antenna, known from the prior art and notably from the document WO 2012/085067, comprises:

- a planar reception antenna, designed to receive an incident wave;
- a planar transmission antenna, designed to transmit the incident wave with a phase shift, and comprising separate first and second radiating surfaces; and
- a phase-shift circuit, configured to define a pair of phase states for the incident wave; the phase-shift circuit comprising first and second switches, each having a conducting state and a non-conducting state, alternately; the conducting and non-conducting states corresponding to a permitted or prevented flow of a current between the separate first and second radiating surfaces of the transmission antenna.

Such a prior art unit cell generates two phase states for the transmission of the incident wave. The two phase states are separated by 180°, in that the first and second switches, each having a conducting state and a non-conducting state and controlled in alternation, excite the transmission antenna in phase or in phase opposition with the reception antenna. In other words, the transmission phase is controlled with a 1 bit quantification, that is to say two phase states, at 0° or 180°.

Such a prior art unit cell is not entirely satisfactory, since it operates in a given passband, and therefore cannot correctly generate two phase states for two incident waves from two primary sources operating in two different passbands, possibly with different polarization states.

Moreover, for a given passband, such a unit cell cannot process the multiplexing of two signals from two primary sources irradiating the transmitter array, or the demultiplexing of a composite signal from a primary source irradiating the transmitter array.

SUMMARY OF THE INVENTION

The invention is intended to overcome, wholly or partially, the aforesaid drawbacks. For this purpose, the invention proposes a unit cell of a transmitter array for transmitting an incident wave with a phase shift, the unit cell comprising:

- a ground plane;
- first and second dielectric substrates, arranged on either side of the ground plane, and each having a first surface, oriented toward the ground plane, and a second surface, opposed to the first surface;
- first and second planar antennas, extending on the second surfaces of the first and second dielectric substrates respectively; and a via, arranged to pass through the first and second dielectric substrates so as to electrically connect the first and second planar antennas; the via being electrically isolated from the ground plane;

the unit cell being remarkable in that it comprises a third planar antenna, extending between the ground plane and the first surface of the first dielectric substrate, and electrically connected to the via.

Definitions

"Ground plane" is taken to mean an electrically conductive surface, preferably metallic, forming an electrical ground plane in such a way as to define a reference potential.

"Dielectric" is taken to mean that the substrate has an electrical conductivity of less than $10^{-8}$ S/cm at 300 K.

"Planar antenna" is taken to mean an electrically conductive plane surface (conventionally metallic) that can transmit/receive electromagnetic radiation. An example of a planar antenna is a microstrip patch.

"Via" is taken to mean a metal-coated hole for establishing an electrical connection between different levels of interconnection.

"Extending between" is taken to mean that the third planar antenna is located in a space delimited by the ground plane and the first surface of the first dielectric substrate, the third planar antenna possibly being in contact with the first surface of the first dielectric substrate.

Thus such a unit cell according to the invention permits the multiplexing of two signals from two primary sources irradiating the transmitter array, owing to the presence of the third planar antenna, or permits the demultiplexing of a composite signal from a primary source irradiating the transmitter array.

The multiplexing of two signals from two primary sources irradiating the transmitter array is permitted when the first and third planar antennas are reception antennas arranged for receiving the two signals, and the second planar antenna is a transmission antenna for the multiplexed signal.

The demultiplexing of a composite signal from a primary source irradiating the transmitter array is permitted when the second planar antenna is a reception antenna for the composite signal and the first and third planar antennas are transmission antennas for the components of the composite signal.

The unit cell according to the invention may have one or more of the following characteristics.

According to a characteristic of the invention, the third planar antenna extends on the first surface of the first dielectric substrate.

Thus one advantage obtained is that the compactness of the unit cell is improved.

According to a characteristic of the invention, the first, second and third planar antennas are configured to operate in the same passband.

Definition

"Configured" is taken to mean that the dimensions of the planar antennas are chosen on the basis of the effective permittivity of the equivalent medium in which the incident wave is propagated, so that the planar antennas can operate in the same given passband.

Thus one advantage obtained is that the reliability of multiplexing/demultiplexing is improved.

According to a characteristic of the invention, the first and third planar antennas are oriented according to two orthogonal linear polarizations.

Thus one advantage that is obtained is that two phase states separated by 180° can be generated when the incident wave irradiated by a primary source is linearly polarized.

According to a characteristic of the invention, the first and third planar antennas are movable in rotation relative to the second planar antenna.

Thus one advantage that is obtained is that a set of phase states, separated by an angle corresponding to the angle of rotation relative to the second planar antenna, can be generated when the incident wave irradiated by a primary source is circularly polarized.

According to a characteristic of the invention, the unit cell comprises a fourth planar antenna, extending between the ground plane and the first surface of the second dielectric substrate, and electrically connected to the via; the first and third planar antennas are configured to operate in two different passbands; and the second and fourth planar antennas are configured to operate in said two different passbands.

In other words, the first and third planar antennas are configured to operate in different first and second passbands, respectively; the second and fourth planar antennas are configured to operate in the first and second passbands respectively, or in the second and first passbands respectively.

Definitions

"Extending between" is taken to mean that the fourth planar antenna is located in a space delimited by the ground plane and the first surface of the second dielectric substrate, the fourth planar antenna possibly being in contact with the first surface of the second dielectric substrate.

"Configured" is taken to mean that the dimensions of the planar antennas are chosen on the basis of the effective permittivity of the equivalent medium in which the incident wave is propagated, so that the planar antennas can operate in a given passband.

Thus one advantage that is obtained is that two phase states can be generated correctly for two incident waves from two primary sources operating in two different passbands, possibly with different polarization states.

According to a characteristic of the invention, the fourth planar antenna extends on the first surface of the second dielectric substrate.

Thus one advantage obtained is that the compactness of the unit cell is improved.

According to a characteristic of the invention, the first planar antenna has separate first second radiating surfaces;
the unit cell comprising a first phase-shift circuit comprising:
first and second switches, each having a conducting state and a non-conducting state, alternately; the conducting and non-conducting states corresponding to a permitted or prevented flow of a current, respectively, between the separate first and second radiating surfaces of the first planar antenna,
first bias lines, arranged to bias the first and second switches of the first phase-shift circuit; and
the first and third planar antennas being electrically connected to the first bias lines, and the second and fourth planar antennas being electrically connected to the ground plane.

Definitions

"Separate" is taken to mean that the first and second radiating surfaces of the first planar antenna are separated from each other by a separation area so as to be electrically isolated.

"Alternately" is taken to mean that the first switch alternates between the conducting state and the non-conducting state, while the second switch simultaneously alternates between the non-conducting state and the conducting state. In other words, at all times, the first and second switches belonging to the first phase-shift circuit have two opposed states, namely conducting/non-conducting and non-conducting/conducting. The conducting/conducting and non-conducting/non-conducting states are not allowed.

"Bias line" is taken to mean a track formed in an electrically conductive material. "Electrically conductive" is taken to mean that the material has an electrical conductivity of more than $10^2$ S/cm at 300 K.

Thus one advantage that is provided is that a reconfigurable unit cell is obtained, in which the phase-shift control by the first phase-shift circuit is common on both of the passbands. This is because the first and third planar antennas, configured to operate in two different passbands, are electrically connected to the first bias lines of the first phase-shift circuit.

According to a characteristic of the invention, the unit cell comprises a third dielectric substrate extending between the ground plane and the third planar antenna, the first bias lines extending on the third dielectric substrate.

Thus one advantage obtained is that the compactness of the unit cell is improved.

According to a characteristic of the invention, the first and second planar antennas each have separate first and second radiating surfaces, the unit cell comprising:

a first phase-shift circuit, comprising:

first and second switches, each having a conducting state and a non-conducting state, alternately; the conducting and non-conducting states corresponding to a per lifted or prevented flow of a current respectively, between the separate first and second radiating surfaces of the first planar antenna, first bias lines, arranged on the first surface of the first dielectric substrate for biasing the first and second switches of the first phase-shift circuit, the first planar antenna being electrically connected to the first bias lines; and a second phase-shift circuit, comprising:

first and second switches, each having a conducting state and a non-conducting state, alternately; the conducting and non-conducting states corresponding to a permitted or prevented flow of a current respectively, between the separate first and second radiating surfaces of the second planar antenna, second bias lines, arranged on the first surface of the second dielectric substrate for biasing the first and second switches of the second phase-shift circuit, the second planar antenna being electrically connected to the second bias lines; and the first and second planar antennas being configured to operate in two different passbands, the third and fourth planar antennas being electrically connected to the ground plane.

The first and third planar antennas are configured to operate in different first and second passbands, respectively. The second and fourth planar antennas are configured to operate in the second and first passbands, respectively, so that the first and second planar antennas are configured to operate in two different passbands. This is because the first planar antenna is configured to operate in the first passband, while the second planar antenna is configured to operate in the second passband.

Definitions

"Separate" is taken to mean that the first and second radiating surfaces of the first planar antenna (and of the second planar antenna) are separated from each other by a separation area so as to be electrically isolated.

"Alternately" is taken to mean that the first switch alternates between the conducting state and the non-conducting state, while the second switch belonging to the same phase-shift circuit simultaneously alternates between the non-conducting state and the conducting state. In other words, at all times, the first and second switches belonging to the same phase-shift circuit have two opposed states, namely conducting/non-conducting and non-conducting/conducting. The conducting/conducting and non-conducting/non-conducting states are not allowed.

Thus one advantage that is provided is that a reconfigurable unit cell is obtained, in which the phase-shift control by the first and second phase-shift circuit is independent on both of the passbands. This is because the first and second planar antennas, configured to operate in two different passbands, are electrically connected, respectively, to the first and second bias lines belonging to the first and second phase-shift circuits respectively.

According to a characteristic of the invention, the unit cell comprises:

a third dielectric substrate extending between the ground plane and the first dielectric substrate, the third planar antenna extending on the third dielectric substrate: and a fourth dielectric substrate, comprising a first surface on which the ground plane extends, and a second, opposed, surface on which the fourth planar antenna extends.

Thus one advantage obtained is that the compactness of the unit cell is improved.

The invention also proposes an antenna reconfigurable to an operating frequency, comprising:

a transmitter array comprising a set of unit cells according to the invention; and first and second radiating sources, operating, respectively, in first and second passbands, and arranged to illuminate the transmitter array.

Definition

"Radiating source" is taken to mean any system (preferably a focal system) capable of emitting electromagnetic waves.

BRIEF DESCRIPTION OF THE DRAWINGS

Other characteristics and advantages will be apparent from the detailed description of different embodiments of the invention, the description being accompanied with examples and references to the attached drawings.

DETAILED DESCRIPTION OF THE EMBODIMENTS

For the sake of simplicity, elements that are identical or have the same function are given the same references for the various embodiments.

One object of the invention is a unit cell 1 of a transmitter array for transmitting an incident wave with a phase shift, the unit cell 1 comprising:
- a ground plane PM;
- first and second dielectric substrates S1, S2, arranged on either side of the ground plane PM, and each having a first surface S10, S20, oriented toward the ground plane PM, and a second surface S11, S21, opposed to the first surface S10, S20;
- first and second planar antennas A1, A2, extending on the second surfaces S11, S21 of the first and second dielectric substrates S1, S2, respectively; and
- a via 2 (called the main via), arranged to pass through the first and second dielectric substrates S1, S2 so as to electrically connect the first and second planar antennas A1, A2; the via 2 being electrically isolated from the ground plane PM;

the unit cell 1 being remarkable in that it comprises a third planar antenna A3, extending between the ground plane PM and the first surface S10 of the first dielectric substrate S1, and electrically connected to the via 2.

Ground Plane

The ground plane PM is preferably made of a metallic material, more preferably copper. By way of non-limiting example, the ground plane PM may have a thickness of about 12-17 μm when the operating frequency of the transmitter array antenna is 29 GHz.

First and Second Dielectric Substrates

By way of non-limiting example, the first and second dielectric substrates S1, S2 may be made of a commercially available material such as RT/Duroid® 6002.

The first and second dielectric substrates S1, S2 have a thickness adapted to the operating frequency of the transmitter array antenna, and to the passband to be covered. The thickness of the first and second dielectric substrates S1, S2 is typically between 100 μm and 1500 μm for an operating frequency of between 10 GHz and 300 GHz. By way of non-limiting example, the first and second dielectric substrates S1, S2 may have a thickness of about 254 μm when the operating frequency is 29 GHz.

Passive Unit Cell with 3 Planar Antennas

Figure 5:
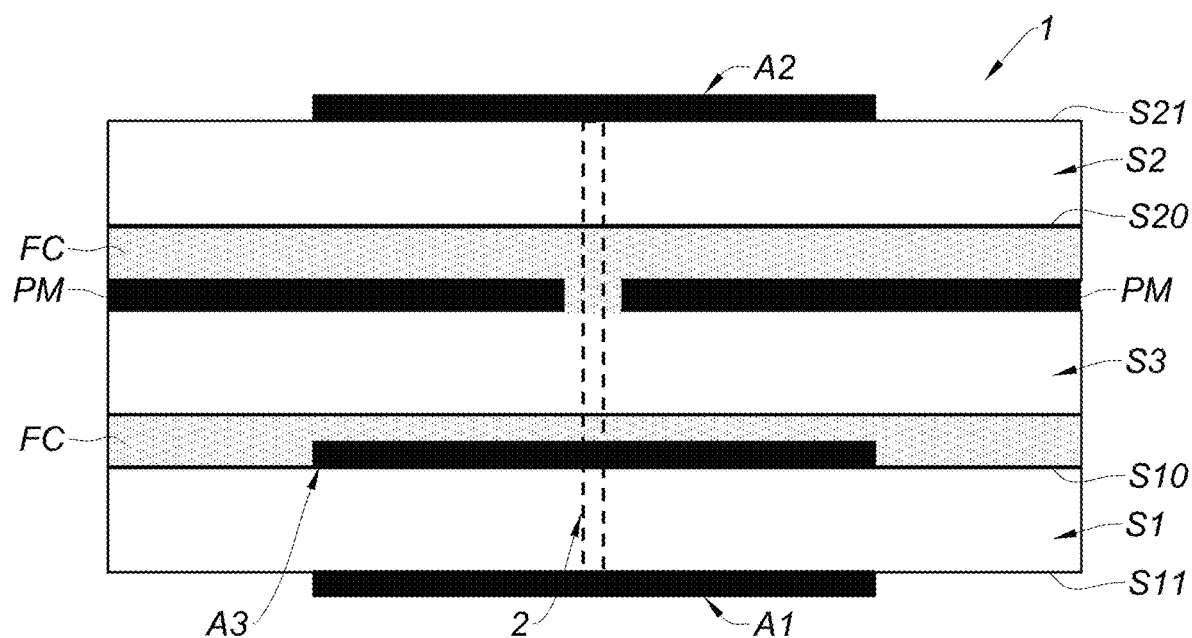
FIG. 5 is a schematic sectional view of a unit cell according to the invention, illustrating an embodiment in which the unit cell is passive and comprises three planar antennas.

This embodiment is illustrated in FIG. 5.

The third planar antenna A3 advantageously extends on the first surface S10 of the first dielectric substrate S1.

The first, second and third planar antennas A1, A2, A3 are advantageously configured to operate in the same passband. The passband is preferably between 10 GHz and 300 GHz.

The first and third planar antennas A1, A3 may be oriented according to two orthogonal linear polarizations. In an alternative, the first and third planar antennas A1, A3 are movable in rotation relative to the second planar antenna A2.

The unit cell 1 advantageously comprises a third dielectric substrate S3 on which the ground plane PM extends.

The unit cell 1 advantageously comprises a bonding film FC arranged to bond the ground plane PM to the first surface S20 of the second dielectric substrate S2. The unit cell 1 advantageously comprises a bonding film FC arranged to bond the third dielectric substrate S3 to the first surface S10 of the first dielectric substrate S1. By way of non-limiting example, the bonding films FC may be made of a thermoplastic copolymer material such as chlorotrifluoroethylene (CTFE). One of the commercially available bonding films that may be mentioned is CuClad® 6700.

The multiplexing of two signals from two primary sources irradiating the transmitter array is permitted when the first and third planar antennas A1, A3 are reception antennas arranged for receiving the two signals, and the second planar antenna A2 is a transmission antenna for the multiplexed signal.

The demultiplexing of a composite signal from a primary source irradiating the transmitter array is permitted when the second planar antenna A2 is a reception antenna for the composite signal and the first and third planar antennas A1, A3 are transmission antennas for the components of the composite signal.

Passive Unit Cell with 4 Planar Antennas

Figure 6:
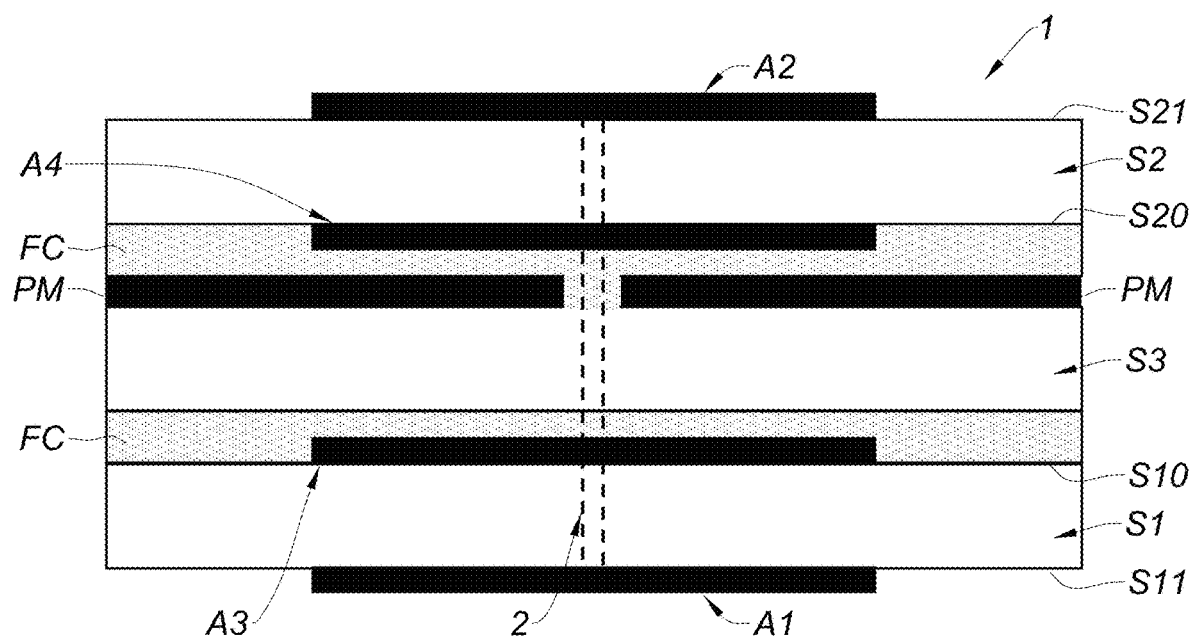
FIG. 6 is a schematic sectional view of a unit cell according to the invention, illustrating an embodiment in which the unit cell is passive and comprises four planar antennas.

This embodiment is illustrated in FIG. 6.

The unit cell 1 comprises a fourth planar antenna A4, extending between the ground plane PM and the first surface S20 of the second dielectric substrate S2, and electrically connected to the via 2.

The first and third planar antennas A1, A3 are configured to operate in two different passbands B1, B2. The second and fourth planar antennas A2, A4 are configured to operate in said two different passbands B1, B2. The two passbands are preferably between 10 GHz and 300 GHz. In other words, the first and third planar antennas A1, A3 are configured to operate in different first and second passbands B1, B2, respectively. The second and fourth planar antennas A2, A4 are configured to operate in the first and second passbands B1, B2 respectively, or in the second and first passbands B2, B1 respectively. As shown in FIGS. 1 to 4, the second and fourth planar antennas A2, A4 are configured to operate in the second and first passbands B2, B1 respectively. However, the second and fourth planar antennas A2, A4 may be configured to operate in the first and second passbands B1, B2 respectively.

The third planar antenna A3 advantageously extends on the first surface S10 of the first dielectric substrate S1. The fourth planar antenna A4 advantageously extends on the first surface S20 of the second dielectric substrate S2.

The unit cell 1 advantageously comprises a third dielectric substrate S3 on which the ground plane PM extends.

The unit cell 1 advantageously comprises a bonding film FC arranged to bond the ground plane PM to the first surface S20 of the second dielectric substrate S2. The unit cell 1 advantageously comprises a bonding film FC arranged to bond the third dielectric substrate S3 to the first surface S10 of the first dielectric substrate S1. By way of non-limiting example, the bonding films FC may be made of a thermoplastic copolymer material such as chlorotrifluoroethylene (CTFE). One of the commercially available bonding films that may be mentioned is CuClad® 6700.

As shown in FIGS. 1 to 4, two phase states can be correctly generated for two incident waves from two primary sources operating in two different passbands, possibly with different polarization states.

Figure 1:
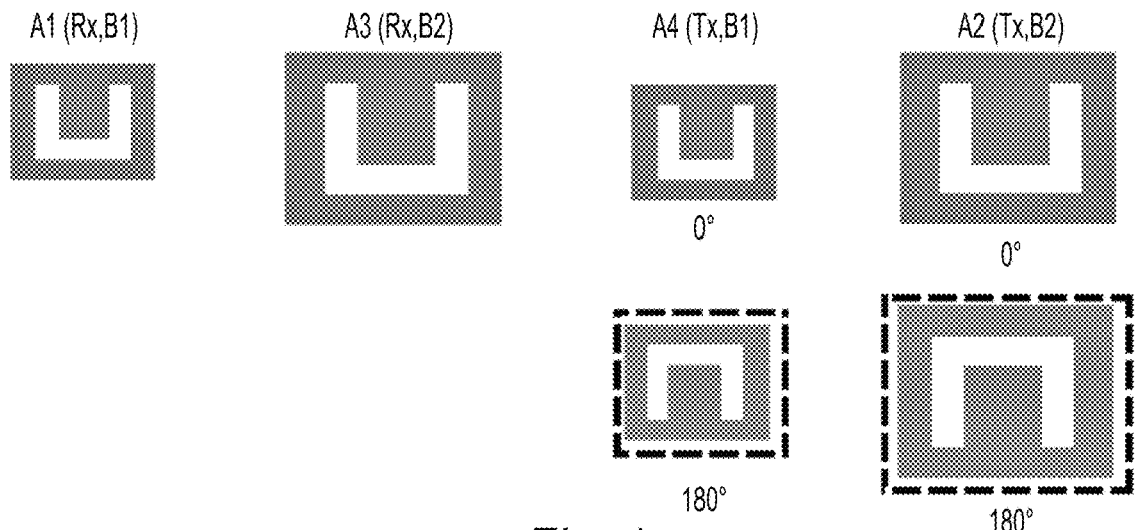
FIG. 1 comprises schematic views from above of four planar antennas of a unit cell according to the invention, permitting a single linear polarization state for the two radiations transmitted by the unit cell. Rx denotes a planar antenna used for reception. Tx denotes a planar antenna used for transmission. B1 and B2 denote first and second passbands. The broken lines show a rotation through 180° of the corresponding planar antenna. A1, A2, A3 and A4 denote, respectively, the first, second, third and fourth planar antennas of a unit cell according to the invention.

In the embodiment shown in FIG. 1, the unit cell 1 permits a single linear polarization state for the two radiations transmitted by the second and fourth planar antennas A2, A4. The second and fourth planar antennas A2, A4 may undergo a rotation of 180° about the normal to their radiating surfaces in order to generate two phase states.

Figure 2:
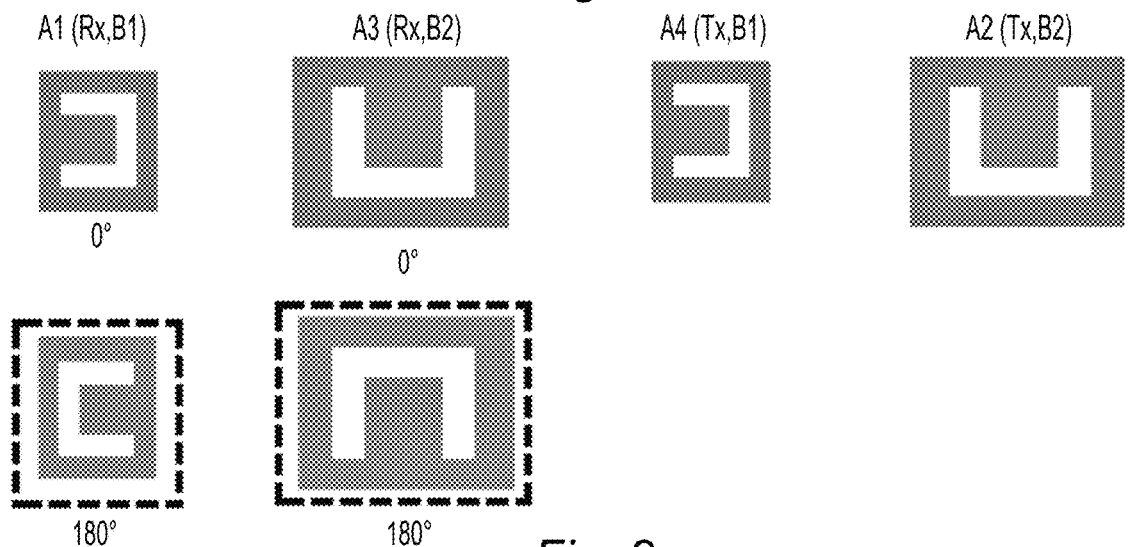
FIG. 2 comprises schematic views from above of four planar antennas of a unit cell according to the invention, permitting two (orthogonal) linear polarization states for the two radiations transmitted by the unit cell. Rx denotes a planar antenna used for reception. Tx denotes a planar antenna used for transmission. B1 and B2 denote first and second passbands. The broken lines show a rotation through 180° of the corresponding planar antenna. A1, A2, A3 and A4 denote, respectively, the first, second, third and fourth planar antennas of a unit cell according to the invention.

In the embodiment shown in FIG. 2, the unit cell 1 permits two linear (orthogonal) polarization states for the two radiations transmitted by the second and fourth planar antennas A2, A4. The first and third planar antennas A1, A3 may undergo a rotation of 180° about the normal to their radiating surfaces in order to generate two phase states.

Figure 3:
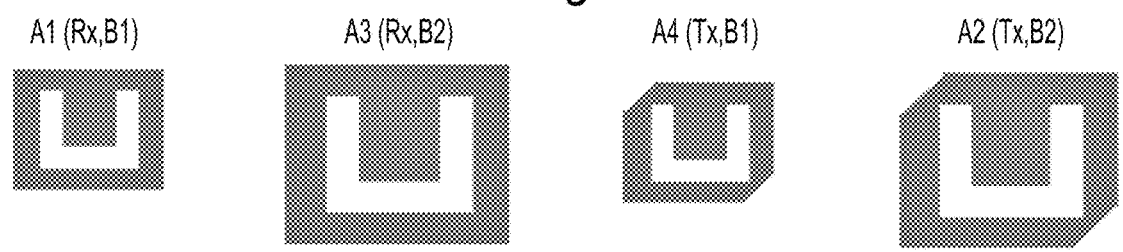
FIG. 3 comprises schematic views from above of four planar antennas of a unit cell according to the invention, permitting a single circular polarization state for the two radiations transmitted by the unit cell. Rx denotes a planar antenna used for reception. Tx denotes a planar antenna used for transmission. B1 and B2 denote first and second passbands. A1, A2, A3 and A4 denote, respectively, the first, second, third and fourth planar antennas of a unit cell according to the invention.

In the embodiment shown in FIG. 3, the unit cell 1 permits a single circular polarization state for the two radiations transmitted by the second and fourth planar antennas A2, A4. The second and fourth planar antennas A2, A4 have two opposed vertices beveled so as to provide circular polarization. The second and fourth planar antennas A2, A4 may be movable in rotation about the normal to their radiating surfaces in order to generate a set of phase states.

Figure 4:
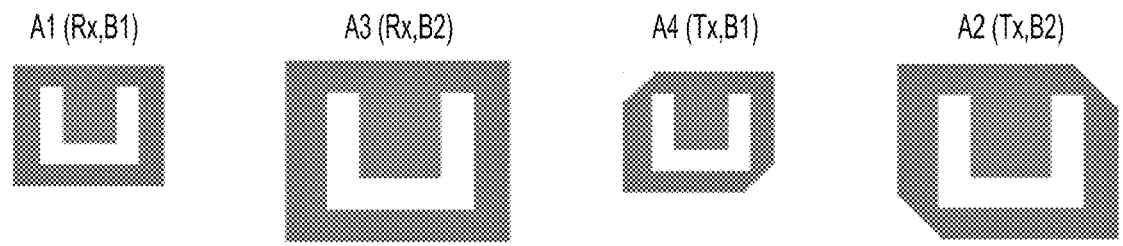
FIG. 4 comprises schematic views from above of four planar antennas of a unit cell according to the invention, permitting two circular polarization states (right-hand and left-hand) for the two radiations transmitted by the unit cell. Rx denotes a planar antenna used for reception. Tx denotes a planar antenna used for transmission. B1 and B2 denote first and second passbands. A1, A2, A3 and A4 denote, respectively, the first, second, third and fourth planar antennas of a unit cell according to the invention.

In the embodiment shown in FIG. 4, the unit cell 1 permits two circular (right-hand and left-hand) polarization states for the two radiations transmitted by the second and fourth planar antennas A2, A4. The second and fourth planar antennas A2, A4 have two different beveled opposed vertices so as to provide right- and left-hand circular polarization. The second and fourth planar antennas A2, A4 may be movable in rotation about the normal to their radiating surfaces in order to generate a set of phase states.

Figure 7:
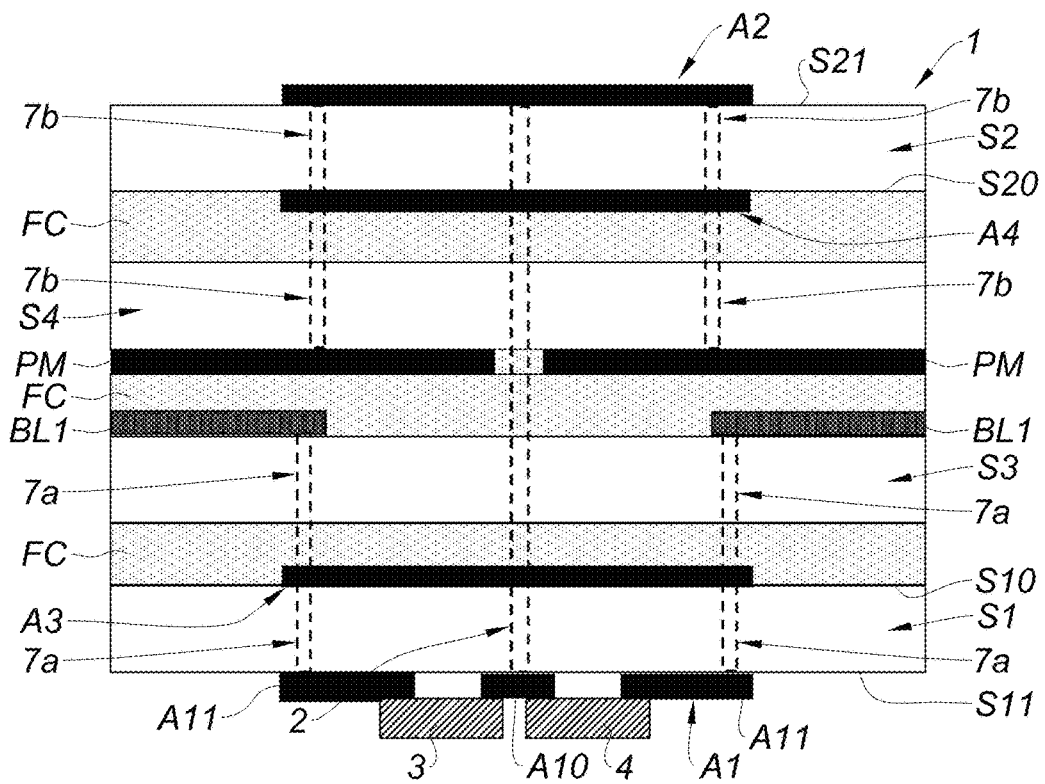
FIG. 7 is a schematic sectional view of a unit cell according to the invention, illustrating an embodiment in which the unit cell is active, with common phase-shift control on the two passbands.

Active Unit Cell with 4 Planar Antennas: Common Phase Shift Control on the 2 Passbands This embodiment is illustrated in FIG. 7. This embodiment makes it possible, notably, to correctly generate, in an active manner, using a phase-shift circuit, two phase states for two incident waves from two primary sources operating in two different passbands, possibly with different polarization states.

The unit cell 1 comprises a fourth planar antenna A4, extending between the ground plane PM and the first surface S20 of the second dielectric substrate S2, and electrically connected to the via 2.

The first and third planar antennas A1, A3 are configured to operate in two different passbands B1, B2. The second and fourth planar antennas A2, A4 are configured to operate in said two different passbands B1, B2. The two passbands are preferably between 10 GHz and 300 GHz. In other words, the first and third planar antennas A1, A3 are configured to operate in different first and second passbands B1, B2, respectively. The second and fourth planar antennas A2, A4 are configured to operate in the first and second passbands B1, B2 respectively, or in the second and first passbands B2, B1 respectively.

The third planar antenna A3 advantageously extends on the first surface S10 of the first dielectric substrate S1. The fourth planar antenna A4 advantageously extends on the first surface S20 of the second dielectric substrate S2.

The first planar antenna A1 has first and second radiating surfaces A10, A11 that are separate, in the sense that they are separated from each other by a separation area so as to be electrically isolated from each other. For this purpose, a slot is advantageously formed in the first planar antenna A1 to electrically isolate the separate first and second radiating surfaces A10, A11. The slot defines the separation area. The slot is preferably annular, with a rectangular cross section. Evidently, other shapes for the slot are feasible, such as an elliptical or circular shape. According to a variant embodiment, the electrical isolation of the first and second radiating surfaces A10, A11 of the first planar antenna A1 may be provided by a dielectric material.

The first and second radiating surfaces A10, A11 of the first planar antenna A1 advantageously have an axis of symmetry so as not to degrade the polarization of the incident wave. The first radiating surface A10 of the first planar antenna A1 preferably forms a ring with a rectangular cross section. The second radiating surface A11 of the first planar antenna A1 preferably forms a rectangular strip. The second radiating surface A11 of the first planar antenna A1 is advantageously circumscribed by the first radiating surface A10 of the first planar antenna A1 so as to avoid the formation of parasitic currents. The first and second radiating surfaces A10, A11 of the first planar antenna A1 are preferably made of a metallic material, more preferably copper. Additional radiating surfaces may advantageously be stacked on the first and second radiating surfaces A10, A11 of the first planar antenna A1 in order to increase the passband B1 of the first planar antenna A1.

The unit cell 1 comprises a first phase-shift circuit comprising:
  first and second switches 3, 4 each having a conducting state and a non-conducting state, alternately, the conducting and non-conducting states corresponding to a permitted or prevented flow of a current respectively, between the separate first and second radiating surfaces A10, A11 of the first planar antenna A1, and first bias lines BL1, arranged to bias the first and second switches 3, 4 of the first phase-shift circuit.

The first bias lines BL1 are electrically conducting tracks, forming means for controlling the first and second switches 3, 4 of the first phase-shift circuit. The first bias lines BL1 are preferably made of a metallic material, more preferably copper.

The first and third planar antennas A1, A3 are electrically connected to the first bias lines BL1, preferably by means of first vias 7a. The second and fourth planar antennas A2, A4 are electrically connected to the ground plane PM, preferably by means of second vias 7b.

The unit cell 1 advantageously comprises a third dielectric substrate S3 extending between the ground plane PM and the third planar antenna A3. The first bias lines BL1 advantageously extend on the third dielectric substrate S3. The unit cell 1 advantageously comprises a fourth dielectric substrate S4 on which the ground plane PM extends. The unit cell 1 advantageously comprises a bonding film FC arranged to bond the ground plane PM to the third dielectric substrate S3. The unit cell 1 advantageously comprises a bonding film FC arranged to bond the third dielectric substrate S3 to the first surface S10 of the first dielectric substrate S1. The unit cell 1 advantageously comprises a bonding film FC arranged to bond the fourth dielectric substrate S4 to the first surface S20 of the second dielectric substrate S2. By way of non-limiting example, the bonding films FC may be made of a thermoplastic copolymer material such as chlorotrifluoroethylene (CTFE). One of the commercially available bonding films that may be mentioned is CuClad® 6700.

By way of non-limiting example, the third and fourth dielectric substrates S3, S4 may be made of a commercially available material such as RT/Duroid® 6002. The third and fourth dielectric substrates S3, S4 have a thickness adapted to the operating frequency of the transmitter array antenna, and to the passband to be covered. The thickness of the third and fourth dielectric substrates S3, S4 is typically between 100 µm and 1500 µm for an operating frequency of between 10 GHz and 300 GHz. By way of non-limiting example, the third and fourth dielectric substrates S3, S4 may have a thickness of about 254 µm when the operating frequency is 29 GHz.

The first and second switches 3, 4 of the first phase-shift circuit may extend on the first and second radiating surfaces A10, A11 of the first planar antenna A1. By way of variant, the first and second switches 3, 4 of the first phase-shift circuit may be formed on the second surface S11 of the first dielectric substrate S1, in the separation area of the first and second radiating surfaces A10, A11 of the first planar antenna A1. The first and second switches 3, 4 of the first phase-shift circuit are advantageously formed on the second surface S11 of the first dielectric substrate S1, in the separation area, in one piece (monolithically) with the first planar antenna A1. "In one piece" is taken to mean that the first planar antenna A1 and the first and second switches 3, 4 of the first phase-shift circuit share a single substrate, in this case the first dielectric substrate S1.

By way of non-limiting example, the first and second switches 3, 4 of the first phase-shift circuit may be p-i-n diodes, MEMS (Micro Electro-Mechanical Systems), or NEMS ("Nano Electro-Mechanical Systems"). The p-i-n diodes may be made of AlGaAs. Other embodiments would be feasible for the switches. By way of non-limiting example, radiofrequency switches such as diodes, transistors, photodiodes or phototransistors are possible. The choice of a device for controlling the switches depends on the technology chosen. By way of example, the following devices may be used:

an optical fiber for a photoelectric switch, a laser beam generated by external means and exciting a photoelectric switch, and an electromagnetic wave according to the principles of remote power supply, known from the field of RFID ("Radio Frequency Identification").

Figure 8:
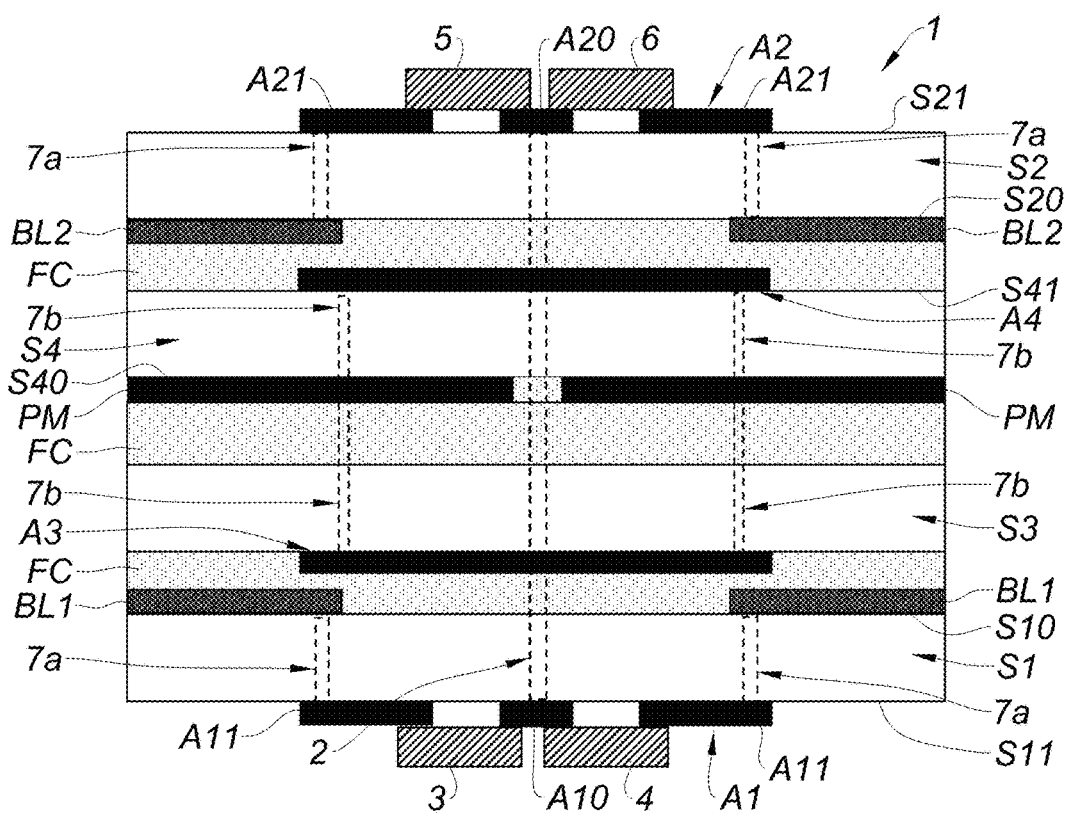
FIG. 8 is a schematic sectional view of a unit cell according to the invention, illustrating an embodiment in which the unit cell is active, with independent phase-shift control on the two passbands.

Active Unit Cell with 4 Planar Antennas: Independent Phase Shift Control on the 2 Passbands This embodiment is illustrated in FIG. 8. This embodiment makes it possible, notably, to correctly generate, in an active manner, using two phase shift circuits, two phase states for two incident waves from two primary sources operating in two different passbands, possibly with different polarization states.

The unit cell 1 comprises a fourth planar antenna A4, extending between the ground plane PM and the first surface S20 of the second dielectric substrate S2, and electrically connected to the via 2.

The first and third planar antennas A1, A3 are configured to operate in two different passbands B1, B2. The second and fourth planar antennas A2, A4 are configured to operate in said two different passbands B1, B2. The two passbands are preferably between 10 GHz and 300 GHz. In other words, the first and third planar antennas A1, A3 are configured to operate in different first and second passbands B1, B2, respectively. The second and fourth planar antennas A2, A4 are configured to operate in the second and first passbands B2, B1, respectively, so that the first and second planar antennas A1, A2 are configured to operate in two different passbands B1, B2. The first planar antenna A1 is configured to operate in the first passband B1, while the second planar antenna A2 is configured to operate in the second passband B2.

The first and second planar antennas A1, A2 each have separate first and second radiating surfaces A10, A20; A11, A21. The first planar antenna A1 has first and second radiating surfaces A10, A11 that are separate, in the sense that they are separated from each other by a separation area so as to be electrically isolated from each other. For this purpose, a slot is advantageously formed in the first planar antenna A1 to electrically isolate the separate first and second radiating surfaces A10, A11. The slot defines the separation area. The slot is preferably annular, with a rectangular cross section. Evidently, other shapes for the slot are feasible, such as an elliptical or circular shape. According to a variant embodiment, the electrical isolation of the first and second radiating surfaces A10, A11 of the first planar antenna A1 may be provided by a dielectric material.

The second planar antenna A2 has first and second radiating surfaces A20, A21 that are separate, in the sense that they are separated from each other by a separation area so as to be electrically isolated from each other. For this purpose, a slot is advantageously formed in the second planar antenna A2 to electrically isolate the separate first and second radiating surfaces A20, A21. The slot defines the separation area. The slot is preferably annular, with a rectangular cross section. Evidently, other shapes for the slot are feasible, such as an elliptical or circular shape. According to a variant embodiment, the electrical isolation of the first and second radiating surfaces A20, A21 of the second planar antenna A2 may be provided by a dielectric material.

The first and second radiating surfaces A10, A11 of the first planar antenna A1 advantageously have an axis of symmetry so as not to degrade the polarization of the incident wave. The first radiating surface A10 of the first planar antenna A1 preferably forms a ring with a rectangular cross section. The second radiating surface A11 of the first planar antenna A1 preferably forms a rectangular strip. The second radiating surface A11 of the first planar antenna A1 is advantageously circumscribed by the first radiating surface A10 of the first planar antenna A1 so as to avoid the formation of parasitic currents. The first and second radiating surfaces A10, A11 of the first planar antenna A1 are preferably made of a metallic material, more preferably copper. Additional radiating surfaces may advantageously be stacked on the first and second radiating surfaces A10, A11 of the first planar antenna A1 in order to increase the passband B1 of the first planar antenna A1.

The first and second radiating surfaces A20, A21 of the second planar antenna A2 advantageously have an axis of symmetry so as not to degrade the polarization of the incident wave. The first radiating surface A20 of the second planar antenna A2 preferably forms a ring with a rectangular cross section. The second radiating surface A21 of the second planar antenna A2 preferably forms a rectangular strip. The second radiating surface A21 of the second planar antenna A2 is advantageously circumscribed by the first radiating surface A20 of the first planar antenna A2 so as to avoid the formation of parasitic currents. The first and second radiating surfaces A20, A21 of the second planar antenna A2 are preferably made of a metallic material, more preferably copper. Additional radiating surfaces may advantageously be stacked on the first and second radiating surfaces A20, A21 of the second planar antenna A2 in order to increase the passband B2 of the second planar antenna A2.

The unit cell 1 comprises:
a first phase-shift circuit, comprising:
first and second switches 3, 4, each having a conducting state and a non-conducting state alternately, the conducting and non-conducting states corresponding to a permitted or prevented flow of a current respectively, between the separate first and second radiating surfaces A10, A11 of the first planar antenna A1, and
first bias lines BL1, arranged on the first surface S10 of the first dielectric substrate S1 to bias the first and second switches 3, 4 of the first phase-shift circuit; and
a second phase-shift circuit, comprising:
first and second switches 5, 6, each having a conducting state and a non-conducting state alternately, the conducting and non-conducting states corresponding to a permitted or prevented flow of a current respectively, between the separate first and second radiating surfaces A20, A21 of the second planar antenna A2, and
second bias lines BL2, arranged on the first surface S20 of the second dielectric substrate S2 to bias the first and second switches 5, 6 of the second phase-shift circuit.

The first bias lines BL1 are electrically conducting tracks, forming means for controlling the first and second switches 3, 4 of the first phase-shift circuit. The first bias lines BL1 are preferably made of a metallic material, more preferably copper. The second bias lines BL2 are electrically conducting tracks, forming means for controlling the first and second switches 5, 6 of the second phase-shift circuit. The second bias lines BL2 are preferably made of a metallic material, more preferably copper.

The first planar antenna A1 is electrically connected to the first bias lines BL1, preferably by means of first vias 7a. The second planar antenna A2 is electrically connected to the second bias lines BL2, preferably by means of first vias 7a.

The first and second planar antennas A1, A2 are configured to operate in two different passbands B1, B2. As mentioned above, the first planar antenna A1 is configured to operate in the first passband B1, while the second planar antenna A2 is configured to operate in the second passband B2.

The third and fourth planar antennas A3, A4 are electrically connected to the ground plane PM, preferably by means of second vias 7b.

The unit cell 1 advantageously comprises:
a third dielectric substrate S3, extending between the ground plane PM and the first dielectric substrate S1, the third planar antenna A3 extending on the third dielectric substrate S3; and
a fourth dielectric substrate S4, comprising a first surface S40 on which the ground plane PM extends, and a second, opposed, surface S41 on which the fourth planar antenna A4 extends.

The unit cell 1 advantageously comprises a bonding film FC arranged to bond the ground plane PM to the third dielectric substrate S3. The unit cell 1 advantageously comprises a bonding film FC arranged to bond the third dielectric substrate S3 to the first surface S10 of the first dielectric substrate S1. The unit cell 1 advantageously comprises a bonding film FC arranged to bond the fourth dielectric substrate S4 to the first surface S20 of the second dielectric substrate S2. By way of non-limiting example, the bonding films FC may be made of a thermoplastic copolymer material such as chlorotrifluoroethylene (CTFE). One of the commercially available bonding films that may be mentioned is CuClad® 6700.

By way of non-limiting example, the third and fourth dielectric substrates S3, S4 may be made of a commercially available material such as RT/Duroid® 6002. The third and fourth dielectric substrates S3, S4 have a thickness adapted to the operating frequency of the transmitter array antenna, and to the passband to be covered. The thickness of the third and fourth dielectric substrates S3, S4 is typically between 100 µm and 1500 µm for an operating frequency of between 10 GHz and 300 GHz. By way of non-limiting example, the third and fourth dielectric substrates S3, S4 may have a thickness of about 254 µm when the operating frequency is 29 GHz.

The first and second switches 3, 4 of the first phase-shift circuit may extend on the first and second radiating surfaces A10, A11 of the first planar antenna A1. By way of variant, the first and second switches 3, 4 of the first phase-shift circuit may be formed on the second surface S11 of the first dielectric substrate S1, in the separation area of the first and second radiating surfaces A10, A11 of the first planar antenna A1. The first and second switches 3, 4 of the first phase-shift circuit are advantageously formed on the second surface S11 of the first dielectric substrate S1, in the separation area, in one piece (monolithically) with the first planar antenna A1. "In one piece" is taken to mean that the first planar antenna A1 and the first and second switches 3, 4 of the first phase-shift circuit share a single substrate, in this case the first dielectric substrate S1.

The first and second switches 5, 6 of the second phase-shift circuit may extend on the first and second radiating surfaces A20, A21 of the second planar antenna A2. By way of variant, the first and second switches 5, 6 of the second phase-shift circuit may be formed on the second surface S21 of the second dielectric substrate S2, in the separation area of the first and second radiating surfaces A20, A21 of the second planar antenna A2. The first and second switches 5, 6 of the second phase-shift circuit are advantageously formed on the second surface S21 of the second dielectric substrate S2, in the separation area, in one piece (monolithically) with the second planar antenna A2. "In one piece" is taken to mean that the second planar antenna A2 and the first and second switches 5, 6 of the second phase-shift circuit share a single substrate, in this case the second dielectric substrate S2.

By way of non-limiting example, the first and second switches 3, 4; 5, 6 of the first and second phase-shift circuits may be p-i-n diodes, MEMS (Micro Electro-Mechanical Systems), or NEMS ("Nano Electro-Mechanical Systems"). The p-i-n diodes may be made of AlGaAs. Other embodiments would be feasible for the switches. By way of non-limiting example, radiofrequency switches such as diodes, transistors, photodiodes or phototransistors are possible. The choice of a device for controlling the switches depends on the technology chosen. By way of example, the following devices may be used:

an optical fiber for a photoelectric switch,
a laser beam generated by external means and exciting a photoelectric switch, and
an electromagnetic wave according to the principles of remote power supply, known from the field of RFID ("Radio Frequency Identification").

Electrical Connection Between the Planar Antennas

The first, second, third, and (if present) fourth planar antennas A1, A2, A3, A4 are electrically interconnected, so that they can be powered and coupled, in part by means of the main via 2 which is preferably central and is preferably metallic. The main via 2 passes through an opening formed in the ground plane PM. The main via 2 is not in contact with the ground plane PM, and therefore the main via 2 is electrically isolated from the ground plane PM. By way of example, for an operating frequency of 29 GHz, the main via 2 has a diameter of about 150 μm. The main via 2 is preferably connected to the first, second, third and fourth planar antennas A1, A2, A3, A4 by connection points. As a general rule, the positions of the connection points vary according to the specific geometry of the planar antennas, in such a way that the fundamental resonance mode is excited. The main via 2 advantageously extends along the normal to the surfaces of the planar antennas. It should be noted that the main via 2 passes through the dielectric substrates S1 to S4 and the bonding films FC.

Reconfigurable Antenna

The invention also proposes an antenna reconfigurable to an operating frequency, comprising:
a transmitter array comprising a set of unit cells 1 according to the invention; and
first and second radiating sources R1 and R2, operating, respectively, in first and second passbands B1, B2, and arranged to illuminate the transmitter array.

Figure 9:
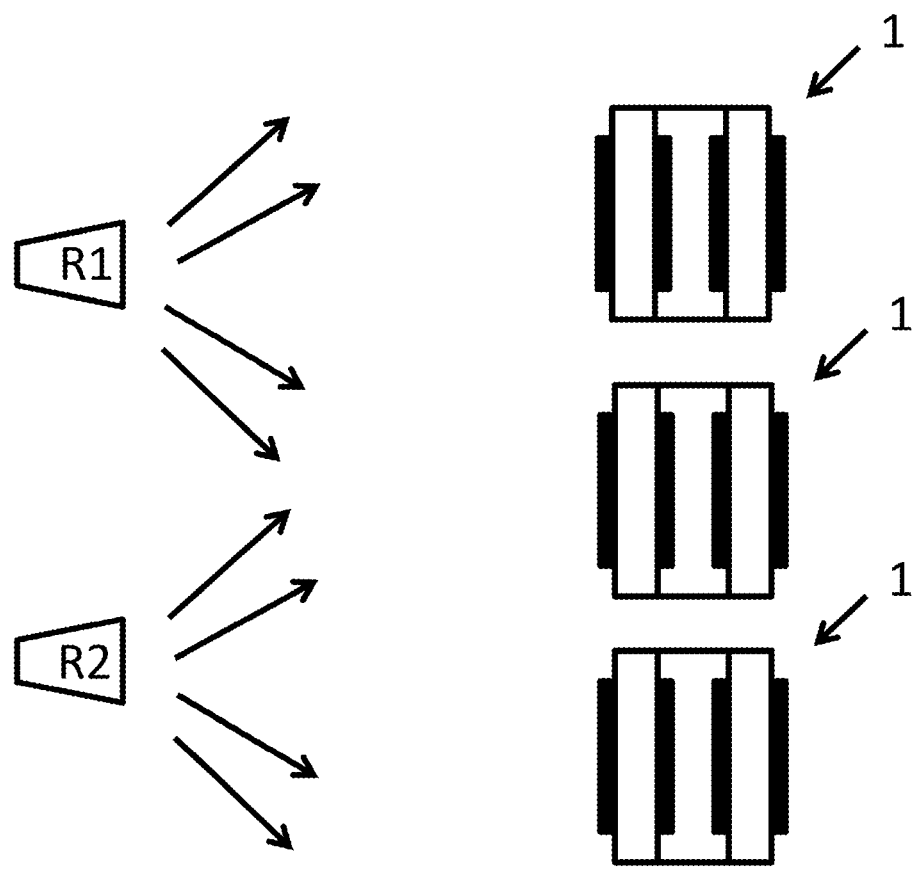
FIG. 9 is a schematic sectional view of a transmitter array with a set of unit cells.

An example of the above antenna is shown in FIG. 9.

The operating frequency is preferably between 10 GHz and 300 GHz.

The invention is not limited to the embodiments described above. Those skilled in the art will be capable of considering their technically useful combinations and substituting equivalents for them.

The invention claimed is:

1. A unit cell of a transmitter array for transmitting an incident wave with a phase shift, the unit cell comprising:
a ground plane;
first and second dielectric substrates, arranged on either side of the ground plane, and each having a first surface, oriented toward the ground plane, and a second surface, opposed to the first surface;
first and second planar antennas, extending on the second surfaces of the first and second dielectric substrates, respectively;
a via, arranged to pass through the first and second dielectric substrates so as to electrically connect the first and second planar antennas; the via being electrically isolated from the ground plane; and
a third planar antenna, extending between the ground plane and the first surface of the first dielectric substrate, and electrically connected to the via.

2. The unit cell as claimed in claim 1, wherein the third planar antenna extends on the first surface of the first dielectric substrate.

3. The unit cell as claimed in claim 1, wherein the first, second and third planar antennas are configured to operate in a same passband.

4. The unit cell as claimed in claim 3, wherein the first and third planar antennas are oriented according to two orthogonal linear polarizations.

5. The unit cell as claimed in claim 3, wherein the first and third planar antennas are movable in rotation relative to the second planar antenna.

6. The unit cell as claimed in claim 1, further comprising a fourth planar antenna, extending between the ground plane and the first surface of the second dielectric substrate, and electrically connected to the via; wherein
the first and third planar antennas are configured to operate in different first and second passbands, respectively; and
the second and fourth planar antennas are configured to operate in the first and second passbands respectively, or in the second and first passbands respectively.

7. The unit cell as claimed in claim 6, wherein the fourth planar antenna extends on the first surface of the second dielectric substrate.

8. The unit cell as claimed in claim 7, wherein
the third planar antenna extends on the first surface of the first dielectric substrate;
the first planar antenna has separate first and second radiating surfaces; and
the unit cell comprises a first phase-shift circuit comprising:
first and second switches each having a conducting state and a non-conducting state alternately, the conducting and non-conducting states corresponding to a permitted or prevented flow of a current respectively, between the separate first and second radiating surfaces of the first planar antenna, and
first bias lines, arranged to bias the first and second switches of the first phase-shift circuit;
the first and third planar antennas being electrically connected to the first bias lines, and the second and fourth planar antennas being electrically connected to the ground plane.

9. The unit cell as claimed in claim 8, comprising a third dielectric substrate, extending between the ground plane and the third planar antenna, the first bias lines extending on the third dielectric substrate.

10. The unit cell as claimed in claim 6, wherein the first and second planar antennas each have separate first and second radiating surfaces; the unit cell comprising:
a first phase-shift circuit, comprising:
first and second switches, each having a conducting state and a non-conducting state alternately, the conducting and non-conducting states corresponding to a permitted or prevented flow of a current respectively, between the separate first and second radiating surfaces of the first planar antenna, and first bias lines, arranged on the first surface of the first dielectric substrate to bias the first and second switches of the first phase-shift circuit; the first planar antenna being electrically connected to the first bias lines; and a second phase-shift circuit, comprising:

first and second switches, each having a conducting state and a non-conducting state alternately, the conducting and non-conducting states corresponding to a permitted or prevented flow of a current respectively, between the separate first and second radiating surfaces of the second planar antenna, and second bias lines, arranged on the first surface of the second dielectric substrate to bias the first and second switches of the second phase-shift circuit; the second planar antenna being electrically connected to the second bias lines;

the second and fourth planar antennas being configured to operate in the second and first passbands, respectively, so that the first and second planar antennas are configured to operate in two different passbands, the third and fourth planar antennas being electrically connected to the ground plane.

11. The unit cell as claimed in claim 10, comprising:

a third dielectric substrate, extending between the ground plane and the first dielectric substrate, the third planar antenna extending on the third dielectric substrate; and a fourth dielectric substrate, comprising a first surface on which the ground plane extends, and a second, opposed, surface on which the fourth planar antenna extends.

12. An antenna reconfigurable to an operating frequency, comprising:

a first transmitter array comprising a set of unit cells as claimed in claim 6; and first and second radiating sources, operating, respectively, in first and second passbands, and arranged to illuminate the first transmitter array.

* * * * *